United States Patent

Hiraoka et al.

[11] Patent Number: 5,948,860
[45] Date of Patent: *Sep. 7, 1999

[54] PROPYLENE POLYMER COMPOSITIONS

[75] Inventors: Shoji Hiraoka; Masayoshi Yamaguchi; Hajime Inagaki; Mikio Hashimoto, all of Kuga-gun, Japan

[73] Assignee: Mitsui Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/780,783

[22] Filed: Jan. 9, 1997

Related U.S. Application Data

[63] Continuation of application No. 08/528,863, Sep. 15, 1995, abandoned, which is a continuation of application No. 08/201,404, Feb. 24, 1994, abandoned.

[30] Foreign Application Priority Data

Feb. 25, 1993 [JP] Japan ..................................... 5-036320
Feb. 4, 1994 [JP] Japan ..................................... 6-012907

[51] Int. Cl.$^6$ .............................. C08L 51/06; C08L 53/02
[52] U.S. Cl. ................................. 525/74; 525/71; 525/73; 525/77; 525/78; 525/80; 525/194; 525/285; 524/504
[58] Field of Search .................. 525/71, 74, 77, 525/78, 80, 194, 73, 285; 524/504

[56] References Cited

U.S. PATENT DOCUMENTS 3,651,028  3/1972  Maemoto et al. ................. 525/330.5
4,076,924  2/1978  Toyota et al. ........................... 526/125
4,157,435  6/1979  Toyota et al. ........................... 526/125
4,331,561  5/1982  Luciani et al. ......................... 526/125
5,212,239  5/1993  Mallikarjun ............................. 525/74
5,225,483  7/1993  Datta et al. .............................. 525/73
5,247,018  9/1993  Maeda et al. .......................... 525/193

FOREIGN PATENT DOCUMENTS 0336780  11/1989  European Pat. Off. .
0525585   3/1993  European Pat. Off. .
9302135   4/1993  WIPO .

OTHER PUBLICATIONS

Mitsui Petrochem KK WPI Acc No. 77–78037Y/44—English Abstract—JPA 126590/1975.

*Primary Examiner*—Mark L. Warzel
*Attorney, Agent, or Firm*—Sherman and Shalloway

[57] ABSTRACT

Disclosed is a propylene polymer composition comprising (a) a propylene polymer, (b) an olefin type elastomer and (c) a polar group-containing olefin polymer composition obtained by heating (c-1) an olefin polymer containing a carboxyl group or an acid anhydrous group in its molecule and (c-2) an amino compound, each in a specific amount. Also disclosed is a propylene polymer composition comprising (a) a propylene polymer, (b) an olefin type elastomer, (c-1) an olefin polymer containing a carboxyl group or an acid anhydrous group in its molecule and (c-2) an amino compound, each in a specific amount. The propylene polymer compositions of the present invention are excellent in properties of being coated with various coatings.

16 Claims, No Drawings

PROPYLENE POLYMER COMPOSITIONS

This application is a continuation of application Ser. No. 08/528,863, filed Sep. 15, 1995, now abandoned, which is a continuation of application Ser. No. 08/201,404, filed Feb. 24, 1994, now abandoned.

FIELD OF THE INVENTION

The present invention relates to propylene polymer compositions excellent in properties of being coated (i.e., having excellent adhesion of coating), and more particularly to propylene polymer compositions which show high adhesion properties to various coatings such as melamine resin coatings and urethane resin coatings even if the compositions are not subjected to any surface treatment with a primer, a solvent, etc.

BACKGROUND OF THE INVENTION

Propylene polymers have been widely prepared on industrial scale because they are excellent in various properties such as mechanical properties, heat resistance, solvent resistance, oil resistance and chemical resistance. The propylene polymers having such properties are broadly used as materials for industrial parts, e.g., automotive parts and electrical apparatus parts, and daily necessaries. The propylene polymers are chemically inert and high in the safety because they have no polar groups in their molecules. However, because of having no polar groups, they are poor in the adhesion properties to other resins. Therefore, for coating the molded product formed from the propylene polymer with, for example, an urethane resin coating, it is required to perform such a treatment to improve affinity of the surface of the product for the resin coating, as electrical treatment (e.g., corona discharge), mechanical surface-roughening treatment, flame treatment, oxygen treatment or ozone treatment. Prior to practicing these surface treatments, generally adopted are a method of beforehand cleaning the surface of the molded product with a solvent such as alcohol or aromatic hydrocarbon and a method of beforehand cleaning it with vapors of a solvent such as trichloroethylene, perchloroethylene, pentachloroethylene or toluene.

In order to conduct any of the above-mentioned surface treatments, an apparatus for such treatment is necessary, and this is a disadvantage in economy. In addition, any of these treatments requires a long period of time. Other than the method of the pretreatment of the molded product, also utilized is a method of coating the molded product with a primer which is able to adhere to propylene polymers and then applying a coating such as an urethane resin coating to the surface of the primer layer. In this method, however, two steps comprising the primer coating (undercoating) and the topcoating (final coating) are necessary, and hence this method also needs a long period of time for the coating. Further, there is involved such a problem that formation of the two-layer structure consisting of the primer layer and the topcoating layer on the molded product needs cost.

With regard to the coating of molded products formed from the propylene polymers, the molded products are generally subjected to some treatment or other as described above. In other words, the molded products formed from the conventionally known propylene polymers must be subjected to a pretreatment prior to the coating.

Accordingly, the advent of propylene polymers which do not need such pretreatments as described above and are excellent in adhesion of coatings has been desired for a long time.

OBJECT OF THE INVENTION

The present invention is made to solve the above-mentioned problems on the propylene resin compositions, and it is an object of the invention to provide propylene polymer compositions having excellent adhesion to various coatings such as melamine resin coatings and urethane resin coatings.

SUMMARY OF THE INVENTION

The first propylene polymer composition according to the present invention comprises:

(a) a propylene polymer in an amount of 1 to 99 parts by weight, (b) an olefin elastomer in an amount of 99 to 1 part by weight, the total amount of said component (a) and said component (b) being 100 parts by weight, and (c) a polar group-containing olefin polymer in an amount of 1 to 30 parts by weight based on 100 parts by weight of the total amount of the component (a) and the component (b), said polar group-containing olefin polymer being obtained by heating (c-1) an olefin polymer containing a carboxyl group or an acid anhydride group in its molecule and (c-2) an amino compound.

The second propylene polymer composition according to the present invention comprises:

(a) a propylene polymer in an amount of 1 to 99 parts by weight, (b) an olefin elastomer in an amount of 99 to 1 part by weight, the total amount of said component (a) and said component (b) being 100 parts by weight, (c-1) an olefin polymer containing a carboxyl group or an acid anhydride group in its molecule, in an amount of 1 to 20 parts by weight based on 100 parts by weight of the total amount of the component (a) and the component (b), and (c-2) an-amino compound in an amount of 0.01 to 10 parts by weight based on 100 parts by weight of the total amount of the component (a) and the component (b).

DETAILED DESCRIPTION OF THE INVENTION

The propylene polymer compositions according to the present invention will be described in detail hereinafter.

The first propylene polymer composition of the invention comprises:

(a) a propylene polymer, (b) an olefin elastomer, and (c) a polar group-containing olefin polymer obtained by heating (c-1) an olefin polymer containing a carboxyl group or an acid anhydride group in its molecule and (c-2) an amino compound, each in a specific amount.

The second propylene polymer composition of the invention comprises:

(a) a propylene polymer, (b) an olefin elastomer, (c-1) an olefin polymer containing a carboxyl group or an acid anhydride group in its molecule, and (c-2) an amino compound, each in a specific amount.

First, each component of the propylene polymer compositions according to the invention is described below in detail.

Propylene Polymer (a)

The propylene polymer (a) used for the invention is a homopolymer of propylene or a copolymer of propylene with other α-olefin. Examples of the α-olefins copolymerizable with propylene include ethylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, 1-methylhexene, 1-dimethylpentene, 1-trimethylbutene, 1-ethylpentene, 1-octene, 1-methylpentene, 1-dimethylhexene, 1-trimethylpentene, 1-ethylhexene, 1-methylethylpentene, 1-diethylbutene, 1-propylpentene, 1-decene, 1-methylnonene, dimethyloctene, 1-trimethylheptene, 1-ethyloctene, 1-methylethylheptene, 1-diethylhexene, 1dodecene and hexadodecene. These α-olefins may form random copolymers or block copolymers together with propylene.

In the present invention, preferred are a propylene homopolymer, a crystalline propylene/ethylene block copolymer having an ethylene content of 2 to 40% by mol, and a crystalline propylene/ethylene random copolymer having an ethylene content of 0.5 to 10% by mol.

The propylene polymer (a) has a melt flow rate (MFR, measured in accordance with ASTM D 1238 at 230° C. under a load of 2.16 kg) of 0.05 to 200 g/10 min, preferably 0.05 to 100 g/10 min, more preferably 0.5 to 60 g/10 min. By the use of the propylene polymer having such MFR value, excellent moldability can be assured. It is desired that the density of the propylene polymer (a) is in the range of usually 0.89 to 0.92 g/cm$^3$.

The propylene polymer (a) having such properties as mentioned above can be prepared by various processes. In one typical process, the propylene polymer (a) can be prepared in the presence of a catalyst formed from a solid titanium catalyst component and an organometallic compound catalyst component or in the presence of a catalyst formed from the above two components and an electron donor.

The solid titanium catalyst component used in this process is a titanium catalyst component which is titanium tetrachloride or a titanium tetrachloride composition prepared by various processes and is supported on a carrier having a specific surface area of preferably not less than 100 m$^2$/g, or a titanium catalyst component which contains as its essential components magnesium, halogen, an electron donor (preferably aromatic carboxylic ester or alkyl group-containing ether) and titanium and is supported on a carrier having a specific surface area of preferably not less than 100 m$^2$/g. Particularly, a propylene polymer prepared by using the latter carrier catalyst component is preferred.

The organometallic compound catalyst component is preferably an organoaluminum compound. Examples of the organoaluminum compound include trialkylaluminum, dialkylaluminum halide, alkylaluminum sesquihalide and alkylaluminum dihalide. The organoaluminum compound can be appropriately selected according to the kind of the titanium catalyst component used.

Employable as the electron donor is an organic compound containing an oxygen atom, a nitrogen atom, a phosphorus atom, a sulfur atom, a silicon atom or a boron atom. Preferred examples of the electron donor include ester compounds containing these atoms and ether compounds containing these atoms.

Processes for preparing propylene polymers using the above-described carrier catalyst components are disclosed in detail, for example, in Japanese Patent Laid-Open Publications No. 108385/1975, No. 126590/1975, No. 20297/1976, No. 28189/1976 and No. 151691/1977, and the techniques described in these publications can be also applied to the present invention.

The propylene polymer (a) is used in an amount of 1 to 99 parts by weight, preferably 20 to 95 parts by weight, more preferably 30 to 80 parts by weight, based on 100 parts by weight of the total amount of the propylene polymer (a) and the olefin elastomer (b).

Olefin Elastomer (b)

The olefin elastomer (b) used for the invention is a copolymer of an α-olefin such as ethylene, propylene, 1-butene, 1-pentene, 1-hexene and 1-octene, or a copolymer of such α-olefin with a non-conjugated diene.

Examples of the non-conjugated diene include dicyclopentadiene, 1,4-hexadiene, dicyclooctadiene, methylenenorbornene and 5-ethylidene-2-norbornene.

Examples of the olefin elastomer (b) include amorphous elastomeric copolymers derived from olefins, such as ethylene/propylene copolymer rubber, ethylene/1-butene copolymer rubber, ethylene/propylene/1-butene copolymer rubber, ethylene/propylene/non-conjugated diene copolymer rubber, ethylene/1-butene/non-conjugated diene rubber and ethylene/propylene/1-butene/non-conjugated diene copolymer rubber.

The olefin elastomer (b) has a Mooney viscosity [ML$_{1+4}$(100° C.), JIS K 6300] of 10 to 150, preferably 40 to 120. The iodine value (degree of unsaturation) of the olefin elastomer (b) is preferably 16 or less.

The olefin elastomer (b) is used in an amount of 99 to 1 part by weight, preferably 80 to 5 parts by weight, more preferably 70 to 20 parts by weight, based on 100 parts by weight of the total amount of the propylene polymer (a) and the olefin elastomer (b).

Polar Group-Containing Olefin Polymer (c)

The polar group-containing olefin polymer (c) used for the first propylene polymer of the present invention is obtained by heating (c-1) an olefin polymer containing a carboxyl group or an acid anhydride group in its molecule and (c-2) an amino compound.

Olefin Polymer (c-1)

Some examples of the olefin polymer (c-1) used as a starting material of the polar group-containing olefin polymer composition (c) are:

(1) a copolymer of an α-olefin with an unsaturated compound containing a carboxyl group or an acid anhydride group in its molecule;

(2) a copolymer obtained by grafting an unsaturated compound containing a carboxyl group or an acid anhydride group in its molecule to a homopolymer or copolymer of an α-olefin; and (3) a copolymer obtained by grafting an unsaturated compound containing a carboxyl group or an acid anhydride group in its molecule to a copolymer of an α-olefin with an unsaturated compound containing a carboxyl group or an acid anhydride group in its molecule.

The above olefin polymers (1) to (3) are now described in more detail.

Examples of the α-olefins used for the above olefin polymer (1) include the same α-olefins as enumerated before with respect to the propylene polymer (a), which are copolymerizable with propylene.

Examples of the unsaturated compound containing a carboxyl group or an acid anhydride group in its molecule, which is used for the above olefin polymer (1), include α, β-unsaturated carboxylic acids, such as acrylic acid, methacrylic acid, α-ethylacrylic acid, maleic acid, fumaric acid, itaconic acid, citraconic acid, tetrahydrophthalic acid and methyltetrahydrophthalic acid; α,β-unsaturated carboxylic anhydrides, such as maleic anhydride, itaconic anhydride, citraconic anhydride and tetrahydrophthalic anhydride; and unsaturated carboxylic anhydrides, such as bicyclo[2.2.1] hepto-2-ene-5,6-dicarboxylic anhydride. Of these, preferred are acrylic acid, maleic acid, itaconic acid, maleic anhydride and itaconic anhydride.

In the olefin polymer (1), a molar ratio of the unsaturated compound to α-olefin (unsaturated compound/α-olefin) is in the range of 3/97 to 40/60, preferably 5/95 to 35/65.

The olefin polymer (1) can be prepared by, for example, a conventionally known process such as a high-pressure radical polymerization. In the preparation of the olefin polymer (1) by means of the high-pressure radical polymerization, the above-mentioned unsaturated compound is copolymerized with an α-olefin in the presence of a radical initiator in an reaction vessel kept at a pressure of 1,000 to 3,000 atm and at a temperature of 90 to 300° C.

The olefin polymer (1) prepared by the above process contains the carboxyl group or the acid anhydride group in an amount of 0.01 to 50% by weight, preferably 0.05 to 10% by weight, per 100% by weight of the olefin polymer (1).

There is no specific limitation on the intrinsic viscosity of the olefin polymer (1) as prepared by the above process, but the olefin polymer (1) is preferably of low-molecular weight from the viewpoint of dispersibility in the propylene polymer composition. The intrinsic viscosity of the olefin polymer (1) as measured in decalin at 135° C. is preferably in the range of 0.1 to 2.0 dl/g, more preferably 0.1 to 1.0 dl/g, most preferably in the range of 0.15 to 0.8 dl/g, particularly preferably 0.2 to 0.5 dl/g.

When the olefin polymer (1) has the intrinsic viscosity as mentioned above, propylene polymer compositions can be easily prepared and the propylene polymer compositions thus prepared have excellent mechanical properties and excellent adhesion properties to coatings such as urethane resin coatings.

The homopolymer or copolymer of an α-olefin used for the olefin polymer (2) includes polymers described before with respect to the propylene polymer (a) and the olefin elastomer (b). Specifically, examples thereof include propylene homopolymer, propylene/ethylene block copolymer, propylene/ethylene random copolymer, ethylene/propylene copolymer rubber, ethylene/1-butene copolymer rubber, ethylene/propylene/1-butene copolymer rubber, ethylene/propylene/non-conjugated diene copolymer rubber, ethylene/1-butene/non-conjugated diene copolymer rubber and ethylene/propylene/1-butene/non-conjugated diene copolymer rubber. Also employable as the homopolymer of an α-olefin are high-density polyethylene, high-pressure low-density polyethylene, linear low-density polyethylene, poly-1-butene and poly-4-methyl-1-pentene. Of these, preferred are a propylene homopolymer and a crystalline propylene/ethylene random copolymer having an ethylene content of 0 to 10% by mol, preferably 1 to 5% by mol, from the viewpoints of rigidity and adhesion of coating.

Examples of the unsaturated compound containing a carboxyl group or an acid anhydride group in its molecule, which is used for the olefin polymer (2), are the same as those used for the aforesaid olefin polymer (1).

Examples of the copolymer of an α-olefin with the unsaturated compound, which is used for the olefin polymer (3), include ethylene/acrylic acid copolymer, ethylene/methacrylic acid copolymer, ethylene/vinyl acetate copolymer, ethylene/vinyl alcohol copolymer, ethylene/ethyl acrylate copolymer and ethylene/maleic anhydride copolymer.

Examples of the unsaturated compound containing a carboxyl group or an acid anhydride group in its molecule, which is used for the olefin polymer (3), are the same as those used for the aforesaid olefin polymer (1).

The olefin polymers (2) and (3) can be obtained by heating the α-olefin homopolymer, the α-olefin copolymer, the α-olefin polymer (e.g., a copolymer of an α-olefin and the unsaturated compound) and the unsaturated compound containing a carboxyl group or an acid anhydride group in its molecule in the presence of a radical initiator to perform graft reaction.

As the radical initiator, compounds such as organic peroxides and azo compounds are employable.

Particular examples of the organic peroxides include:

peroxy ketals, such as 1,1-bis(t-butylperoxy)-3,5,5-trimethylcyclohexane, 1,1-bis(t-butylperoxy)cyclohexane, 2,2-bis(t-butylperoxy)octane, n-butyl-4,4-bis(t-butylperoxy)valerate and 2,2-bis(t-butylperoxy)butane;

dialkyl peroxides, such as di-t-butyl peroxide, dicumyl peroxide, t-butylcumyl peroxide, α,α'-bis(t-butylperoxy-m-isopropyl)benzene, 2,5-dimethyl-2,5-bis(t-butylperoxy)hexane and 2,5-dimethyl-2,5-bis(t-butylperoxy)hexyne-3;

diacyl peroxides, such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide;

peroxy esters, such as t-butyl peroxyacetate, t-butyl peroxyisobutyrate, t-butylperoxy-2-ethylhexanoate, t-butyl peroxylaurate, t-butyl peroxybenzoate, di-t-butyl peroxyisophthalate, 2,5-dimethyl-2,5-di(benzoylperoxy)hexane, t-butylperoxymaleic acid, t-butyl peroxyisopropylcarbonate and cumyl peroxyoctate; and hydroperoxides, such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide.

Of these, preferred are 1,1-bis(t-butylperoxy)-3,5,5-trimethylcyclohexane, di-t-butyl peroxide, dicumyl peroxide, 2,5-dimethyl-2,5-bis(t-butylperoxy)hexane, 2,5-dimethyl-2,5-bis(t-butylperoxy)hexyne-3, benzoyl peroxide, 2,4-dichlorobenzoyl peroxide, m-toluoyl peroxide and t-butylperoxy-2-ethylhexanoate.

The azo compound is, for example, azoisobutyronitrile.

The above-exemplified radical initiators can be used singly or in combination.

The unsaturated compound containing a carboxyl group or an acid anhydride group in its molecule is used in an amount of 0.01 to 50 parts by weight, preferably 0.1 to 40 parts by weight, based on 100 parts by weight of the α-olefin polymer.

The radical initiator is used in an amount of 0.01 to 10 parts by weight, preferably 0.05 to 8 parts by weight, based on 100 parts by weight of the α-olefin polymer.

The graft modification can be carried out by conventionally known processes, for example, by the following processes.

(i) A process of melt-kneading the α-olefin polymer and the unsaturated compound containing a carboxyl group or an acid anhydride group in its molecule in the presence of the radical initiator by means of a kneading apparatus such as an intensive mixer or an extruder.

This kneading is carried out preferably in an atmosphere of an inert gas such as nitrogen. The kneading temperature used herein is such a temperature that the half-life of the radical initiator used becomes 1 minute, generally in the range of 150 to 280° C., preferably 170 to 240° C., and the kneading time is in the range of usually 30 seconds to 20 minutes, preferably 1 to 10 minutes.

(ii) A process of adding the unsaturated compound containing a carboxyl group or an acid anhydride group in its molecule and the radical initiator to the α-olefin polymer in the molten state with stirring to mix them with each other.

This stirring is carried out preferably in an atmosphere of an inert gas such as nitrogen. The stirring temperature used herein is such a temperature that the half-life of the radical initiator used becomes 1 minute, generally in the range of 150 to 280° C., preferably 170 to 240° C. The mixing time is in the range of usually 0.5 to 10 hours, preferably 1 to 5 hours. The unsaturated compound containing a carboxyl group or an acid anhydride group in its molecule and the radical initiator may be added together during the melting procedure of the α-olefin polymer, or may be dropwise added separately to the molten α-olefin polymer.

(iii) A process of adding the unsaturated compound containing a carboxyl group or an acid anhydride group in its molecule and the radical initiator to an organic solvent solution of the α-olefin polymer and heating them.

This heating is carried out preferably in an atmosphere of an inert gas such as nitrogen. The heating temperature used herein is such a temperature that the half-life of the radical initiator used becomes 1 minute, generally in the range of 100 to 200° C., preferably 120 to 180° C., and the heating time is in the range of usually 0.5 to 10 hours, preferably 1 to 5 hours. The unsaturated compound containing a carboxyl group or an acid anhydride group in its molecule and the radical initiator may be added together when the α-olefin polymer is dissolved in the organic solvent, or may be dropwise added separately to the organic solvent solution of the α-olefin polymer.

Employable as the organic solvent are aromatic hydrocarbons such as benzene, toluene and xylene; alicyclic hydrocarbons such as cyclohexane and methylcyclohexane; and chlorine type hydrocarbons such as chlorobenzene and dichlorobenzene.

(iv) A process of adding the unsaturated compound containing a carboxyl group or an acid anhydride group in its molecule and the radical initiator to an aqueous dispersion of the α-olefin polymer and heating them.

This heating is carried out preferably in an atmosphere of an inert gas such as nitrogen. The heating temperature used herein is in the range of usually 60 to 150° C., preferably 80 to 100° C., and the heating time is in the range of usually 0.5 to 10 hours, preferably 1 to 5 hours. The unsaturated compound containing a carboxyl group or an acid anhydride group in its molecule and the radical initiator may be added together when the α-olefin polymer is dispersed in water, or may be dropwise added separately to the aqueous dispersion of the α-olefin polymer.

Other than the above-exemplified radical initiators, water-soluble persulfates such as potassium persulfate and ammonium persulfate are also employable as the radical initiator.

(v) A process of heating the α-olefin polymer and the unsaturated compound containing a carboxyl group or an acid anhydride group in its molecule in the presence of the radical initiator at a temperature of not higher than the melting point of the α-olefin polymer, for example, not higher than 165° C. in the case of a propylene polymer, or not higher than 140° C. in the case of an ethylene polymer.

This heating is carried out preferably in an atmosphere of an inert gas such as nitrogen. The heating time is in the range of usually 0.5 to 10 hours, preferably 1 to 5 hours. The unsaturated compound containing a carboxyl group or an acid anhydride group in its molecule and the radical initiator may be added together when the α-olefin polymer is heated, or may be dropwise added separately to the already heated α-olefin polymer.

Of the above-mentioned modification processes, preferred are the processes (ii) and (iii) in which the graft amount can be easily made large and modified olefin polymers having an intrinsic viscosity, as measured in decalin at 135° C., of not more than 1.0 dl/g can be easily prepared.

In the olefin polymer (2) or (3) prepared by the above process, the carboxyl group or the acid anhydride group is contained in an amount of 0.01 to 50% by weight, preferably 0.05 to 10% by weight, per 100% by weight of the olefin polymer (2) or (3).

There is no specific limitation on the intrinsic viscosity of the olefin polymer (2) or (3) as prepared in the above processes, but these olefin polymers are preferably of low-molecular weight from the viewpoint of dispersibility in the propylene polymer composition. The intrinsic viscosity of the olefin polymer (2) or (3) as measured in decalin at 135° C. is preferably in the range of 0.1 to 2.0 dl/g, more preferably 0.1 to 1.0 dl/g, most preferably in the range of 0.15 to 0.8 dl/g, particularly preferably 0.2 to 0.5 dl/g.

When the olefin polymer (2) or (3) has the intrinsic viscosity as mentioned above, propylene polymer compositions can be easily prepared and the propylene polymer compositions thus prepared have excellent mechanical properties and excellent adhesion properties to coatings such as urethane resin coatings.

The olefin polymer (c-1) preferably used in the invention is the propylene homopolymer which contains a carboxyl group or an acid anhydride group in its molecule, or the propylene/ethylene random copolymer which has an ethylene content of 1 to 5% by mol and contains a carboxyl group or an acid anhydride group in its molecule. Of various propylene/ethylene random copolymers, particularly preferably used is a propylene/ethylene random copolymer which has an ethylene content of 1 to 5% by mol and an intrinsic viscosity [η], as measured in decalin at 135° C., of 0.1 to 1.0 dl/g and contains a carboxyl group or an acid anhydride group in its molecule.

Amino Compound (c-2)

The amino compound (c-2) used for the invention is a compound having at least one amino group in its molecule.

Examples of the amino compound include:

amino alcohols, such as 2-aminoethanol, 3-amino-1-propanol, 4-amino-1-butanol, 5-amino-1-pentanol, 2-amino-1-butanol, 2-amino-2-methyl-1-propanol, 2-amino-2-methyl-1,3-propanediol, N-aminoethylethanolamine and 2-(2-aminoethoxy) ethanol;

diamines, such as ethylenediamine, propylenediamine, trimethylenediamine, tetramethylenediamine, pentamethylenediamine and hexamethylenediamine;

polyamines, such as diethylenetriamine, triethylenetetramine and tetraethylenepentamine;

dicarboxylic acid amides, such as oxamide, malonamide, succinamide, adipamide, malamide and d-tartaramide;

hydrazines, such as methylhydrazine and ethylhydrazine; and aromatic amines, such as phenylenediamine, toluenediamine, N-methyldiamine, N-methylphenyldiamine and aminodiphenylamine.

Of these, 2-aminoethanol, N-aminoethylethanolamine and 2-(2-aminoethoxy)ethanol are particularly preferred.

The polar group-containing olefin polymer (c) can be obtained by heating the olefin polymer (c-1) containing a carboxyl group or an acid anhydride group in its molecule and the amino compound (c-2), as described above. The amino compound (c-2) is used in an amount of 0.3 to 100 times, preferably 0.5 to 50 times, more preferably 1 to 20 times, as much as the number of moles of the carboxyl group or the acid anhydride group contained in the olefin polymer (c-1).

The heating of both components is carried out, for example, by the following processes:

(I) a process of melt-kneading the olefin polymer (c-1) and the amino compound (c-2);

(II) a process of dissolving the olefin polymer (c-1) and the amino compound (c-2) in an organic solvent and heating the resulting solution;

(III) a process of dispersing the olefin polymer (c-1) and the amino compound (c-2) in an aqueous medium and heating the resulting aqueous dispersion; and (IV) a process of heating the olefin polymer (c-1) and the amino compound (c-2) at a temperature of not lower than the melting point of the olefin polymer (c-1).

There is no specific limitation on the intrinsic viscosity of the polar group-containing olefin polymer (c) prepared by the above processes, but the polar group-containing olefin polymer (c) is preferably of low-molecular weight from the viewpoint of dispersibility in the propylene polymer composition. The intrinsic viscosity of the polar group-containing olefin polymer (c) as measured in decalin at 135° C. is preferably 0.1 to 2.0 dl/g, more preferably 0.1 to 1.0 dl/g, most preferably in the range of 0.15 to 0.8 dl/g, particularly preferably 0.2 to 0.5 dl/g.

The reaction ratio between the olefin polymer (c-1) and the amino compound (c-2) is in the range of 30 to 100%, preferably 50 to 100%, more preferably 80 to 100%, in terms of the reaction ratio based on the carboxyl group or the acid anhydride group contained in the olefin polymer (c-12).

After the polar group-containing olefin polymer composition (c) is prepared as above, if necessary, the unreacted amino compound (c-2) may be removed to purify the composition (c). The purification is carried out, for example, by the following methods:

(X) a method of melting the polar-group containing olefin polymer (c) by heating and then exposing the molten olefin polymer (c) to high vacuum to evaporate the unreacted amino compound (c-2) so as to remove it;

(Y) a method of dissolving the polar-group containing olefin polymer (c) in an organic solvent, then introducing the resulting solution into a poor solvent for the olefin polymer (c-1) and separating the liquid phase by filtration; and (Z) a method of washing a powder of the polar group-containing olefin polymer (c) with a poor solvent for the olefin polymer (c-1).

Even if the polar group-containing olefin polymer (c) contains the unreacted amino compound (c-2), it can be employed for the preparation of the propylene polymer composition of the present invention, as far as the object of the invention is not marred.

In the first propylene polymer composition of the present invention, the polar group-containing olefin polymer (c) is used in an amount of 1 to 30 parts by weight, preferably 1 to 10 parts by weight, more preferably 2 to 7 parts by weight, based on 100 parts by weight of the total amount of the propylene polymer (a) and the olefin elastomer (b).

In the second propylene polymer composition of the present invention, to the propylene polymer (a) and the olefin elastomer (b) are added the olefin polymer (c-1) containing a carboxyl group or an acid anhydride group in its molecule and the amino compound (c-2).

In this case, the olefin polymer (c-1) is used in an amount of 1 to 20 parts by weight, preferably 2 to 10 parts by weight, more preferably 3 to 7 parts by weight, based on 100 parts by weight of the total amount of the propylene polymer (a) and the olefin elastomer (b); and the amino compound (c-2) is used in an amount of 0.01 to 10 parts by weight, preferably 0.05 to 7 parts by weight, more preferably 0.1 to 5 parts by weight, based on 100 parts by weight of the total amount of the propylene polymer (a) and the olefin elastomer (b).

Preparation of Propylene Polymer Composition

The first propylene polymer composition according to the invention is prepared by melt-kneading 1–99 parts by weight of the propylene polymer (a), 99–1 part by weight of the olefin elastomer (b), [with the proviso that the total amount of the component (a) and the component (b) is 100 parts by weight], and 1–30 parts by weight of the polar group-containing olefin polymer composition (c) which is obtained by heating the olefin polymer (c-1) containing a carboxyl group or an acid anhydride group in its molecule and the amino compound (c-2).

The second propylene polymer composition according to the invention is prepared by melt-kneading 1–99 parts by weight of the propylene polymer (a), 99–1 part by weight of the olefin elastomer (b), [with the proviso that the total amount of the component (a) and the component (b) is 100 parts by weight], 1–20 parts by weight of the olefin polymer (c-1) containing a carboxyl group or an acid anhydride group in its molecule, and 0.01–10 parts by weight of the amino compound (c-2).

In order to prepare the first or second propylene polymer composition according to the invention (hereinafter sometimes referred to simply as "propylene polymer composition"), the above-mentioned components are homogeneously mixed so that the amounts of each components are within the above-defined ranges, by applying a mixing method which is carried out in the field of conventional propylene polymers. In this mixing, all the components may be mixed at the same time. Further, it is also possible that some are premixed to prepare so-called "master batch", and the master batch is mixed with the residual components.

In the preparation of the propylene polymer compositions according to the invention, an organotin compound and/or a tertiary amino compound may be further added.

In the invention, each of the organotin compound and the tertiary amino compound plays a role as a catalyst in the reaction of a hydroxyl group of polyol with isocyanate, that is a reaction of producing urethane bonds.

The organotin compound employable for the invention is represented by the formula:

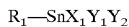

wherein $R_1$ is an alkyl group of 4 to 10 carbon atoms, $X_1$ is an alkyl group of 4 to 10 carbon atoms, a chlorine atom or a hydroxyl group, $Y_1$ and $Y_2$ are each a chlorine atom, —$OCOR_2$ (wherein $R_2$ is an alkyl group, an aryl group or an allylalkyl group) or a hydroxyl group, and $Y_1$ and $Y_2$ may be the same or different from each other.

Particular examples of such organotin compound include n-$C_4H_9Sn(OH)_2Cl$, n-$C_4H_9Sn(OH)Cl_2$, n-$C_4H_9SnCl_3$, $C_8H_{17}SN(OH)_2Cl$, $C_8H_{17}Sn(OH)Cl_2$, $C_8H_{17}SnCl_3$, n-$C_4H_9Sn(OH)_2OCOC_7H_{15}$, n-$C_4H_9Sn(OH)_2OCOC_{11}H_{23}$, n-$C_8H_{17}Sn(OH)_2OCOC_7H_{15}$, n-$C_8H_{17}Sn(OH)_2OCOC_{11}H_{23}$, n-$C_4H_9Sn(OCOC_7H_{15})_3$, (n-$C_4H_9)_2Sn(OCOC_{11}H_{23})_2$, (n-$C_8H_{17})_2Sn(OCOC_{11}H_{23})_2$, (n-$C_4H_9)_2Sn(OCOCH=CHCOOCH_3)_2$ and (n-$C_4H_9)Sn(OCOCH=CHCOOCH_2Ph)_2$.

Of these, preferred are n-$C_4H_9SnCl_3$, (n-$C_4H_9)_2Sn(OCOC_{11}H_{23})_2$ and (n-$C_8H_{17})_2Sn((OCOC_{11}H_{23})_2$.

The organotin compound is used in an amount of 0.01 to 5 parts by weight, preferably 0.05 to 3 parts by weight, based on 100 parts by weight of the total amount of the propylene polymer (a) and the olefin elastomer (b).

Particular examples of the tertiary amino compound employable for the invention include dimethylpropylamine, diethylpropylamine, tris(dimethylaminomethyl)phenol, tetraguanidine, N,N-dibutylethanolamine, N-methyl-N,N-diethanolamine, 1,4-diazabicyclo[2.2.2]octane, ,1,8-diazabicyclo[5.4.0]-7-undecene and tetramethylbutanediamine.

The tertiary amino compound is used in an amount of 0.01 to 5 parts by weight, preferably 0.05 to 3 parts by weight, based on 100 parts by weight of the total amount of the propylene polymer (a) and the olefin elastomer (b).

The propylene polymer compositions of the present invention containing the above-mentioned organotin compound or tertiary amino compound are extremely high in the adhesion of coatings, because those compounds function as catalysts in the curing reaction between polyol of the urethane resin and the isocyanate compound.

The propylene polymer compositions according to the invention may contain, if necessary, various additives such as other thermoplastic resins, softening agents, fillers, pigments, stabilizers, plasticizers, flame retardants, lubricants, antistatic agents and electrical property improvers, as far as the physical properties and the adhesion of coatings of the propylene polymer compositions of the invention are not deteriorated.

In detail, examples of the other thermoplastic resins which may be added include high-density polyethylene, medium-density polyethylene, high-pressure low-density polyethylene, linear low-density polyethylene, poly-1-butene, propylene/1-butene copolymer, styrene/butadiene(/styrene) block copolymer and its hydrogenation product, and styrene/isoprene(/styrene) block copolymer and its hydrogenation product.

The softening agents employable for the invention are, for example, mineral oil softening agents. The mineral oil softening agents are high-boiling petroleum fractions which are used for the purpose of weakening the intermolecular action of the olefin elastomer to facilitate the processing, increasing the dispersibility of the optionally added fillers such as carbon black and white carbon, or lowering rigidity of a vulcanized rubber to improve flexibility or elasticity. These mineral oil softening agents are classified into paraffinic type, naphthenic type and aromatic type.

Examples of the fillers employable for the invention include light calcium carbonate, heavy calcium carbonate, basic calcium carbonate, aluminum hydroxide, magnesium hydroxide, magnesium oxide, kaolin, clay, pyrophylite, sericite, talc, calcium silicate, (wollastonite, xonotlite, petal-like calcium silicate), diatomaceous earth, aluminum silicate, silicic anhydride, hydrous silicic acid, mica, magnesium silicate (asbestos, PFM (Processed Mineral Fiber), sepiolite), potassium titanate, elestadite, gypsum fiber, glass balloon, silica balloon, fly ash balloon, shirasu balloon, carbonaceous balloon, organic type balloon (e.g., phenol resin, urea resin, styrene resin, saran resin), silica, alumina, barium sulfate, aluminum sulfate, calcium sulfate, magnesium sulfate, molybdenum disulfide, graphite, glass fiber (e.g., chopped strand, roving, milled glass fiber, glass flake), cut fiber, rock fiber, micro fiber, carbon fiber, aromatic polyamide fiber, potassium titanate fiber, coumarone-indene resin and petroleum resin.

Examples of the colorants employable for the invention include carbon black, titanium oxide, zinc white, red iron oxide, ultramarine, Prussian blue, azo pigments, nitroso pigments, lake pigments and phthalocyanine pigments.

To the propylene polymer compositions of the present invention, there can be added conventionally known heat stabilizers such as those of phenol type, sulfite type, phenylalkane type, phosphite type and amine type, aging inhibitors, weathering stabilizers, antistatic agents, and lubricants such as metallic soap and wax, in such amounts as generally used for olefin plastics or olefin copolymer rubbers.

The propylene polymer compositions according to the invention are prepared by melt-kneading the above-described components.

As the kneading apparatus, a mixing roll, an intensive mixer (e.g., Banbury mixer, kneader), a single-screw extruder or a twin-screw extruder can be employed, and the kneading apparatus desirably is of non-open type.

The kneading is carried out at a temperature of usually 150 to 280° C., preferably 170 to 240° C., for a period of usually 1 to 20 minutes, preferably 1 to 10 minutes.

In general, the compositions thus obtained are granulated into pellets and the pellets are molded into desired products by means of molding methods which are generally conducted in fields of various thermoplastic resins, for example, injection molding, extrusion molding and calendering.

The molded products obtained from the propylene polymer compositions of the invention are excellent in the adhesion of coatings such as urethane resin coatings and amino resin coatings.

The urethane resin coatings are those which generally form a coating film by a reaction of polyisocyanate with a polyol compound, and they include two types, i.e., one-pack type and two-pack type. Further, there is a powdery coating using block type isocyanate in the urethane resin coatings. The molded products obtained from the propylene polymer compositions of the invention have a good affinity for any type of these urethane resin coatings.

The amino resin coatings include melamine resin coatings, benzoguanamine resin coatings and urea resin coatings. These coatings are those which form a coating film by a process comprising reacting a starting material having an amino group with formaldehyde to produce a monomer having high reactivity, then subjecting the monomer to addition condensation to produce a methylol group and reacting the methylol group with a hydroxyl group of alcohol. These coatings may be used by mixing them with an oil-modified alkyd resin having plasticity, an oil-free alkyd resin, an oil vanish, an acrylic resin or an epoxy ester resin.

Described below is one example of a coating method using, for example, the urethane resin coating among the above-mentioned coatings. A molded product formed from the propylene polymer composition of the present invention is subjected to washing with water and cleaning with an ordinary industrial detergent, each at least once, then further washed with water and heated to dryness. That is, when the molded product obtained from the propylene polymer composition of the invention is to be coated, a conventionally used cleaning treatment (surface treatment) using vapors of a chlorine type solvent is not always necessary. The molded product thus dried is coated with the urethane resin coating, then if necessary heated, to form an urethane resin coating film. The coating film thus formed has extremely high adhesion properties to the molded product, though any cleaning treatment with vapors of a chlorine solvent has not been carried out.

EFFECT OF THE INVENTION

The first propylene polymer composition according to the present invention comprises the propylene polymer, the olefin elastomer and the specific polar group-containing olefin polymer, in a specific amount, respectively, and hence this composition is excellent in adhesion of coatings such as urethane resin coatings, amino resin coatings, etc.

The second propylene polymer composition according to the present invention comprises the propylene polymer, the olefin elastomer, the olefin polymer containing a carboxyl group or an acid anhydride group in its molecule and the amino compound, in a specific amount, respectively, and hence this composition is excellent in the adhesion of coatings such as urethane resin coatings, amino resin coatings, etc.

Further, the propylene polymer compositions of the present invention as described above are excellent in moldability, so that they can be molded by apparatus which are used for conventional thermoplastics, and they are suitable for extrusion molding, calendering, injection molding, etc.

Utilizing the above-mentioned properties, the propylene polymer compositions of the invention can be widely used for parts or materials to be coated with coatings, for example, automotive parts, motorcycle parts, electrical apparatus parts, daily necessaries, civil engineering and construction materials, general industrial materials, office and information machines, packaging materials, sporting goods and medical appliances.

The present invention will be further described below with reference to examples, but it should be construed that the invention is in no way limited to those examples.

Various physical properties of the propylene polymer compositions used in the following examples and comparative examples are measured as follows.
(1) Flexural Modulus (FM)
The flexural modulus was measured in accordance with ASTM D 790 using a specimen having a thickness of ⅛ inch.
(2) Coating Test
The coating tests of Examples 1–28 and 31–47 and Comparative Examples 1–6 and 9–11 are carried out as follows.
Preparation of a Specimen
A square plate formed by a 50-ton injection molding machine was coated with the following coating. Prior to the coating with the coating, the surface of the square plate was beforehand wiped out with a cloth impregnated with isopropanol.
Coating
(a) The square plate was coated with a two-pack urethane resin coating (trade name: R-271, available from Nippon B Chemical K.K.) by means of an air gun so that the thickness of the coating film was 60 μm on dry basis. The baking was carried out at 100° C. for 30 minutes.
(b) The square plate was coated with a melamine resin coating (trade name: Flexene #105, available from Nippon B Chemical K.K.) by means of an air gun so that the thickness of the coating film was 60 μm on dry basis. The baking was carried out at 120° C. for 30 minutes.
Cross-Cut Adhesion Test The adhesion properties were evaluated in accordance with a cross-cut adhesion test described in JIS K 5400. That is, a specimen provided with cross-cuts (i.e., checkered pattern) was prepared, and to the specimen was attached Cellotape (trade name, available from Nichiban Co., Ltd.). Then, the Cellotape was swiftly pulled in the direction of 90° to peel the tape off from the specimen. The number of the coating checkers remaining on the square plate was counted, and the number was taken as an index of the adhesion properties.
Peel Strength Test On a substrate was formed a coating film, and cuts were made at intervals of 1 cm on the coating film by means of a cutter blade until the blade reached the substrate. Then, the edge of the coating film was peeled off from the substrate, followed by pulling the thus peeled edge in the direction of 180° at a rate of 50 mm/min until the coating film was peeled off from the substrate, so as to measure the peel strength.

REFERENCE EXAMPLE 1

Preparation of a Modified Propylene Polymer (1)

50 g of a propylene homopolymer (MFR: 10 g/10 min (ASTM D 1238, 230° C., load of 2.16 kg)) and 500 ml of p-xylene were introduced into a 1-liter glass separable flask and heated to 130° C. to dissolve the propylene homopolymer in p-xylene.

Then, to the resultant solution were dropwise added 5 g of maleic anhydride and 0.5 g of dicumyl peroxide over a period of 4 hours, followed by further heating for another 2 hours. Thereafter, the solution was allowed to stand for cooling and then introduced into acetone to obtain a propylene homopolymer graft-modified with maleic anhydride (i.e., the aforesaid component (c-1), hereinafter called "GPP-1" for short).

The graft amount of maleic anhydride in the obtained GPP-1 was 3.0% by weight when measured by means of infrared absorption spectral analysis. The intrinsic viscosity [η] of the GPP-1 as measured in decalin at 135° C. was 0.38 dl/g.

REFERENCE EXAMPLE 2

Heating of a Mixture of the Modified Propylene Polymer (1) and an Amino Compound 50 g of the GPP-1 obtained in Reference Example 1, 3 g of 2-aminoethanol and 500 ml of p-xylene were introduced into a 1-liter glass separable flask and heated to 140° C. for 3 hours with stirring. A molar ratio between the acid anhydride group derived from maleic anhydride in the GPP-1 and 2-aminoethanol thus introduced into the reaction system was 1:3.2.

Then, the content in the flask was allowed to stand for cooling and introduced into 3 liters of acetone to separate a precipitate by filtration. Then, the precipitate was further subjected to washing with 2 liters of acetone and filtration three times, respectively. The resultant precipitate was vacuum dried to obtain a polar group-containing propylene polymer (i.e., the aforesaid component (c), hereinafter called "MPP-1" for short).

The reaction ratio of the acid anhydride group calculated by the nitrogen atom content determined by elemental analysis of the obtained MPP-1 was 90%. The intrinsic viscosity [η] of the MPP-1 as measured in decalin at 135° C. was 0.35 dl/g.

REFERENCE EXAMPLE 3
Preparation of a Modified Propylene Polymer (2)

1,000 g of a propylene/ethylene random copolymer (MFR: 40 g/10 min (ASTM D 1238, 230° C., load of 2.16 kg), ethylene content: 2% by mol) was introduced into a 5-liter reaction vessel and heated to 380° C., followed by stirring at the same temperature for 1 hour to perform heat degradation. After the thus degraded product was allowed to stand for cooling, it was ground so that the resultant particles passed through a sieve of 20-in mesh.

The intrinsic viscosity [η] of the obtained propylene/ethylene random copolymer (hereinafter called "DPP-1" for short) as measured in decalin at 135° C. was 0.30 dl/g.

300 g of the obtained DPP-1 was introduced into a 1-liter glass separable flask, and the system was purged with nitrogen.

Subsequently, this DPP-1 was heated to 170° C. to melt it, and then to the system were dropwise added 15 g of maleic anhydride and 3.5 g of di-t-butyl peroxide over a period of 5 hours. The melted DPP-1 was further heated for 2 hours, then the pressure in the system was reduced, and the system was deaerated at a pressure of 5 mmHg for 1 hour. After the deaeration, the system was cooled to 160° C. to obtain a modified propylene polymer (i.e., the aforesaid component (c-1), hereinafter called "GPP-2" for short).

The graft amount of maleic anhydride in the obtained GPP-2 was 4.5% by weight when measured by means of infrared absorption spectral analysis. The intrinsic viscosity [η] of the GPP-2 as measured in decalin at 135° C. was 0.35 dl/g.

REFERENCE EXAMPLE 4
Heating of a Mixture of the Modified Propylene Polymer (1) and an Amino Compound 300 g of the GPP-1 obtained in Reference Example 1 and 30 g of N-aminoethylethanolamine were introduced into a 1-liter glass separable flask and then heated to 170° C. to melt them. A molar ratio between the acid anhydride group derived from maleic anhydride in the GPP-1 and N-aminoethylethanolamine thus introduced into the reaction system was 1:2.1.

Subsequently, the content in the flask was heated for 4 hours with stirring, and then the system was kept at a pressure of 5 mmHg for 1 hour to remove the unreacted N-aminoethylethanolamine.

Then, the content in the flask was allowed to stand for cooling to obtain a polar group-containing propylene polymer (i.e., the aforesaid component (c), hereinafter called "MPP-2" for short).

The reaction ratio of the acid anhydride group calculated by the nitrogen atom content determined by elemental analysis of the obtained MPP-2 was 85%. The intrinsic viscosity [η] of the MPP-2 as measured in decalin at 135° C. was 0.38 dl/g.

REFERENCE EXAMPLE 5
Preparation of a Modified Propylene Polymer (3)

A 1-liter stainless steel autoclave equipped with a helical type stirrer having a double helical ribbon was charged with 100 g of the DPP-1 (the degraded propylene/ethylene random copolymer) obtained in Reference Example 3, and the system was completely purged with nitrogen.

Subsequently, a solution consisting of 2 g of maleic anhydride, 0.8 g of benzoyl peroxide and 5 ml of toluene was dropwise added to the DPP-1 over a period of 10 minutes while stirring the DPP-1 at room temperature. After the addition, the resultant mixture was further stirred for 30 minutes at room temperature. Then, the temperature of the system was set to 100° C., followed by heating at the same temperature for 4 hours to obtain a modified product.

Then, the modified product thus obtained was dissolved in p-xylene at 130° C., and the resultant solution was subjected to re-precipitation purification by the use of acetone as a poor solvent, to obtain a modified propylene/ethylene random copolymer (i.e., the aforesaid component (c-1), hereinafter called "GPP-3" for short).

The graft amount of maleic anhydride in the obtained GPP-3 was 1.2% by weight when measured by means of infrared absorption spectral analysis. The intrinsic viscosity [η] of the GPP-3 as measured in decalin at 135° C. was 0.45 dl/g.

REFERENCE EXAMPLE 6
Heating of a Mixture of the Modified Propylene Polymer (3) and an Amino Compound A 1-liter stainless steel autoclave equipped with a helical type stirrer having a double helical ribbon was charged with 100 g of the GPP-3 obtained in Reference Example 5 and 10 g of 2-(2-aminoethoxy)ethanol. A molar ratio between the acid anhydride group derived from maleic anhydride in the GPP-3 and 2-(2-aminoethoxy)ethanol thus introduced into the reaction system was 1:8.

Subsequently, the content in the autoclave was heated for 4 hours with stirring, and then the system was kept at a pressure of 5 mmHg for 1 hour to remove the unreacted 2-(2-aminoethoxy)ethanol.

Then, the content in the autoclave was allowed to stand for cooling to obtain a polar group-containing propylene polymer (i.e., the aforesaid component (c), hereinafter called "MPP-3" for short).

The reaction ratio of the acid anhydride group calculated by the nitrogen atom content determined by elemental analysis of the obtained MPP-3 was 80%. The intrinsic viscosity [η] of the MPP-3 as measured in decalin at 135° C. was 0.48 dl/g.

REFERENCE EXAMPLE 7
Preparation of a Modified Propylene Polymer (4)

100 parts by weight of a propylene homopolymer (MFR: 0.4 g/10 min (ASTM D 1238, 230° C., load of 2.16 kg)), 1.5 parts by weight of maleic anhydride and 0.08 part by weight of 2,5-dimethyl-2,5-bis(t-butylperoxy)hexyne-3 were mixed in a Henschel mixer at room temperature.

Then, the resultant mixture was melt-kneaded by a twin-screw vented extruder (screw diameter: 30 mm, L/D=30) at a cylinder preset temperature of 200° C., and then granulated.

The pellets obtained as above were dissolved in p-xylene at 130° C., and the resultant solution was subjected to re-precipitation purification by the use of acetone as a poor solvent, to obtain a modified propylene homopolymer (i.e., the aforesaid component (c-1), hereinafter called "GPP-4" for short).

The graft amount of maleic anhydride in the obtained GPP-4 was 0.2% by weight when measured by means of infrared absorption spectral analysis. The MFR (ASTM D 1238, 230° C., load of 2.16 kg) of the GPP-4 was 45 g10 min, and the intrinsic viscosity [η] thereof as measured in decalin at 135° C. was 1.50 dl/g.

REFERENCE EXAMPLE 8
Heating of a Mixture of the Modified Propylene Polymer (4) and an Amino Compound 100 parts by weight of the GPP-4 obtained in Reference Example 7 and 5 parts by weight of 2-(2-aminoethoxy)ethanol were mixed in a Henschel mixer. A molar ratio between the acid anhydrous group derived from maleic anhydride in the GPP-4 and 2-(2-aminoethoxy)ethanol thus introduced into the reaction system was 1:10.

Then, the resultant mixture was melt-kneaded by a twin-screw vented extruder (screw diameter: 30 mm, L/D=30) at a cylinder preset temperature of 200° C., to obtain a polar group-containing propylene polymer (i.e., the aforesaid component (c), hereinafter called "MPP-4" for short).

The reaction ratio of the acid anhydride group calculated by the nitrogen atom content determined by elemental analysis of the obtained MPP-4 was 87%. The intrinsic viscosity [η] of the MPP-4 as measured in decalin at 135° C. was 0.48 dl/g.

REFERENCE EXAMPLE 9
Preparation of a Modified Propylene Polymer (5)

A 1-liter stainless steel autoclave equipped with a helical type stirrer having a double helical ribbon was charged with 100 g of a propylene homopolymer (MFR: 45 g/10 min (ASTM D 1238, 230° C., load of 2.16 kg), mean particle diameter: 0.8 mm), and the system was completely purged with nitrogen.

Subsequently, a solution consisting of 5 g of an acrylic acid, 0.2 g of benzoyl peroxide and 10 ml of toluene was dropwise added to the propylene homopolymer over a period of 10 minutes while stirring the propylene homopolymer at room temperature. After the addition, the resultant mixture was further stirred for 30 minutes at room temperature. Then, the temperature of the system was set to 100° C., followed by heating at the same temperature for 4 hours to obtain a modified product.

The modified product thus obtained was dissolved in p-xylene at 130° C., and the resultant solution was subjected to re-precipitation purification by the use of acetone as a poor solvent, to obtain a modified propylene homopolymer (i.e., the aforesaid component (c-1), hereinafter called "GPP-5" for short).

The graft amount of the acrylic acid in the obtained GPP-5 was 4.2% by weight when measured by means of infrared absorption spectral analysis. The intrinsic viscosity [η] of the GPP-5 as measured in decalin at 135° C. was 1.10 dl/g.

REFERENCE EXAMPLE 10
Heating of a Mixture of the Modified Propylene Polymer (5) and an Amino Compound A 1-liter stainless steel autoclave equipped with a helical type stirrer having a double helical ribbon were charged with 100 g of the GPP-5 obtained in Reference Example 9 and 10 g of 2-aminoethanol. A molar ratio between the carboxyl group derived from the acrylic acid in the GPP-5 and 2-aminoethanol thus introduced into the reaction system was 1:3.

Subsequently, the content in the autoclave was heated for 4 hours with stirring, and then the system was kept at a pressure of 5 mmHg for hour to remove the unreacted 2-aminoethanol.

Then, the content in the autoclave was allowed to stand for cooling to obtain a polar group-containing propylene polymer (i.e., the aforesaid component (c), hereinafter called "MPP-5" for short).

The reaction ratio of the carboxyl group calculated by the nitrogen atom content determined by elemental analysis of the obtained MPP-5 was 82%. The intrinsic viscosity [η] of the MPP-5 as measured in decalin at 135° C. was 1.10 dl/g.

REFERENCE EXAMPLE 11
Heating of a Mixture of the Modified Propylene Polymer (2) and an Amino Compound 300 g of the GPP-2 obtained in Reference Example 3, 3 g of 2-aminoethanol and 500 ml of p-xylene were introduced into a 1-liter glass separable flask and heated for 3 hours with stirring. A molar ratio between the acid anhydride group derived from maleic anhydride in the GPP-2 and 2-aminoethanol thus introduced into the reaction system was 1:1.

Subsequently, the content in the flask was allowed to stand for cooling and then introduced into acetone, to obtain a polar group-containing propylene polymer (i.e., the aforesaid component (c), hereinafter called "MPP-6" for short).

The reaction ratio of the acid anhydrous group calculated by the nitrogen atom content determined by elemental analysis of the obtained MPP-6 was 80%. The intrinsic viscosity [η] of the MPP-6 as measured in decalin at 135° C. was 0.32 dl/g.

REFERENCE EXAMPLE 12
Heating of a Mixture of the Modified Propylene Polymer (2) and an Amino Compound A 1-liter stainless steel autoclave equipped with a helical type stirrer having a double helical ribbon was charged with 100 g of the GPP-2 obtained in Reference Example 3 and 10 g of 2-(2-aminoethoxy)ethanol. A molar ratio between the acid anhydride group derived from maleic anhydride in the GPP-2 and 2-(2-aminoethoxy)ethanol thus introduced into the reaction system was 1:2.

Subsequently, the content in the autoclave was heated for 4 hours with stirring, and then the system was kept at a pressure of 5 mmHg for 1 hour to remove the unreacted 2-(2-aminoethoxy)ethanol.

Then, the content in the autoclave was allowed to stand for cooling to obtain a polar group-containing propylene polymer (i.e., the aforesaid component (c), hereinafter called "MPP-7" for short).

The reaction ratio of the acid anhydride group calculated by the nitrogen atom content determined by elemental analysis of the obtained MPP-7 was 85%. The intrinsic viscosity [η] of the MPP-7 as measured in decalin at 135° C. was 0.28 dl/g.

REFERENCE EXAMPLE 13
Heating of a Mixture of the Modified Propylene Polymer (5) and an Amino Compound 300 g of the GPP-5 obtained in Reference Example 9, 3 g of 2-aminoethanol and 500 ml of p-xylene were introduced into a 1-liter glass separable flask. A molar ratio between the carboxyl group derived from the acrylic acid in the GPP-5 and 2-aminoethanol thus introduced into the reaction system was 1:1.

Subsequently, the content in the flask was heated for 3 hours with stirring, then allowed to stand for cooling and introduced into 3 liters of acetone to separate a precipitate by filtration. The precipitate was further subjected to washing with 2 liters of acetone and filtration three times, respectively. The resultant precipitate was vacuum dried to obtain a polar group-containing propylene polymer (i.e., the aforesaid component (c), hereinafter called "MPP-8" for short).

The reaction ratio of the carboxyl group calculated by the nitrogen atom content determined by elemental analysis of the obtained MPP-8 was 80%, The intrinsic viscosity [η] of the MPP-8 as measured in decalin at 135° C. was 1.05 dl/g.

REFERENCE EXAMPLE 14
Heating of a Mixture of the Modified Propylene Polymer (4) and an Amino Compound 50 g of the GPP-4 obtained in Reference Example 7, 2 g of N-aminoethylethanolamine and 500 ml of p-xylene were introduced into a 1-liter glass separable flask and heated at 140° C. for 3 hours. Thereafter, the content in the flask was allowed to stand for cooling and then introduced into acetone to obtain a modified propylene polymer (hereinafter called "MPP-9" for short).

A molar ratio between the acid anhydride group derived from maleic anhydride in the GPP-4 and N-aminoethylethanolamine thus introduced into the reaction system was 1:3.

The reaction ratio of the acid anhydride group calculated by the nitrogen atom content determined by elemental analysis of the obtained MPP-9 was 85%. The intrinsic viscosity [η] of the MPP-9 as measured in decalin at 135° C. was 1.40 dl/g.

EXAMPLES 1–28

The components shown in Table 1 were melt-kneaded by a twin-screw vented extruder (screw diameter: 30 mm, L/D=42) at a cylinder preset temperature of 200° C. to prepare a propylene polymer composition. This composition was molded into a square plate by an injection molding machine to obtain a specimen for the aforesaid flexural test and coating test, and those tests were carried out.

The results are set forth in Table 1.

Details of each components shown in Tables 1, 2 and 3 are as follows.

Propylene polymer (a)

(1) Propylene homopolymer (hereinafter called "PP-1" for short)

MFR (ASTM D 1238, 230° C., load of 2.16 kg): 20 g/10 min

Density: 0.91 g/cm$^3$ (2) Propylene/ethylene block copolymer (hereinafter called "PP-2" for short)

MFR (ASTM D 1238, 230° C., load of 2.16 kg): 14 g/10 min

Ethylene content: 12% by mol

Density: 0.91 g/cm$^3$ (3) Propylene/ethylene copolymer (hereinafter called "PP-3" for short)

MFR (ASTM D 1238, 230° C., load of 2.16 kg): 40 g/10 min

Ethylene content: 10% by mol

Density: 0.91 g/cm$^3$ (4) Propylene/ethylene block copolymer (hereinafter called "PP-4" for short)

MFR (ASTM D 1238, 230° C., load of 2.16 kg): 40 g/10 min

Ethylene content: 12% by mol

Density: 0.91 g/cm$^3$

Olefin Elastomer (b)

(1) Ethylene/propylene copolymer rubber (hereinafter called "EPR" for short)

MFR (ASTM D 1238, 230° C., load or 2.16 kg): 0.7 g/10 min

Ethylene content: 81% by mol

Density: 0.87 g/cm$^3$ (2) Ethylene/1-butene copolymer rubber (hereinafter called "EBR" for short)

MFR (ASTM D 1238, 230° C., load of 2.16 kg): 0.5 g/10 min

Ethylene content: 50% by mol

Density: 0.88 g/cm$^3$

Amino Compound (c-2)

(1) 2-aminoethanol ($H_2NCH_2CH_2OH$, hereinafter called "A-1" for short)

(2) 2-(2-aminoethoxy)ethanol ($H_2NCH_2CH_2OCH_2CH_2OH$, hereinafter called "A-2" for short)

(3) N-aminoethylethanolamine ($H_2NC_2H_4NHC_2H_4OH$, hereinafter called "A-3" for short)

Thermoplastic Resin Other Than the Above Components (1) Linear low-density polyethylene (hereinafter called "LLDPE" for short)

Comonomer: 1-butene

1-Butene content: 2% by mol

MFR (ASTM D 1238, 230° C., load of 2.16 kg): 25 g/10 min

Density: 0.92 g/cm$^3$ (2) Styrene/butadiene/styrene block copolymer hydrogenation product (hereinafter called "SEBS" for short)

Styrene content: 30% by weight

MFR (ASTM D 1238, 230° C., load of 2.16 kg): 4 g/10 min

Orcanotin Compound (1) Dibutyl tin dilaurate (hereinafter called "DBTDL" for short)

Tertiary Amino Compound (1) 1,4-Diazabicyclo[2.2.2]octane (hereinafter called "DABCO" for short)

Filler (1) Talc (2) Magnesium sulfate

COMPARATIVE EXAMPLE 1

Similarly to Example 1, the above PP-1 was molded into a square plate by an injection molding machine to obtain a specimen for the flexural test and the coating test, and the tests were carried out.

The results are set forth in Table 1

COMPARATIVE EXAMPLE 2

Similarly to Example 1, the above EPR was molded into a square plate by an injection molding machine to obtain a specimen for the flexural test and the coating test, and the tests were carried out.

The results are set forth in Table 1.

COMPARATIVE EXAMPLES 3–6

The components shown in Table 1 were melt-kneaded by a twin-screw vented extruder (screw diameter: 30 mm, L/D=42) at a cylinder preset temperature of 200° C. to prepare a propylene polymer composition. This composition was molded into a square plate by an injection molding machine to obtain a specimen for the aforesaid flexural test and coating test, and those tests were carried out.

The results are set forth in Table 1.

TABLE 1-1

| Composition | [Part by weight] | Example 1 | 2 | 3 | 4 | 5 | 6 |
|---|---|---|---|---|---|---|---|
| Component (a) | PP-1 | 60 | 60 | 60 | 60 | 70 | 50 |
| Component (b) | EPR | 40 | 40 | 40 | 40 | 30 | 50 |
| Component (c) | MPP-1 | 10 | — | — | — | — | — |
|  | MPP-2 | — | 5 | — | — | — | — |
|  | MPP-3 | — | — | 3 | — | — | — |
|  | MPP-4 | — | — | — | 3 | — | — |
|  | MPP-5 | — | — | — | — | — | — |
|  | MPP-6 | — | — | — | — | — | — |
|  | MPP-7 | — | — | — | — | — | — |
|  | MPP-8 | — | — | — | — | — | — |
|  | MPP-9 | — | — | — | — | 7 | 3 |
| Other thermoplastic resin | LLDPE | — | — | — | — | — | 10 |
|  | SEBS | — | — | — | — | — | — |
| Organotin compound | DBTDL | — | — | — | — | — | — |
| Physical properties FM | [kg/cm] | 10200 | 10100 | 9800 | 9500 | 12200 | 7000 |
| Adhesion of coating | Cross-cut adhesion test | 100 | 100 | 100 | 100 |  |  |
| Melamine resin coating | Peel strength test (*1) | 850 | 750 | 830 | 380 |  |  |
| Adhesion of coating | Cross-cut adhesion test | 100 | 100 | 100 | 100 | 100 | 100 |
| Urethane resin coating | Peel strength test (*1) | 520 | 420 | 500 | 200 | 600 | 820 |

| Composition | [Part by weight] | Example 7 | 8 | 9 | 10 | 11 | 12 |
|---|---|---|---|---|---|---|---|
| Component (a) | PP-1 | 70 | 60 | 60 | 60 | 60 | 60 |
| Component (b) | EPR | 30 | 40 | 40 | 40 | 40 | 40 |
| Component (c) | MPP-1 | 5 | — | — | — | — | — |
|  | MPP-2 | — | — | — | — | — | — |
|  | MPP-3 | — | — | — | — | — | 3 |
|  | MPP-4 | — | — | — | — | — | — |
|  | MPP-5 | — | 3 | — | — | — | — |
|  | MPP-6 | — | — | 3 | — | — | — |
|  | MPP-7 | — | — | — | 3 | — | — |
|  | MPP-8 | — | — | — | — | 3 | — |
|  | MPP-9 | — | — | — | — | — | — |
| Other thermoplastic resin | LLDPE | — | — | — | — | — | — |
|  | SEBS | 20 | — | — | — | — | — |
| Organotin compound | DBTDL | — | — | — | — | — | 0.5 |
| Physical properties FM | [kg/cm] | 9000 | 9600 | 10000 | 9900 | 9600 | 9800 |
| Adhesion of coating | Cross-cut adhesion test |  | 100 | 100 | 100 | 100 | 100 |
| Melamine resin coating | Peel strength test (*1) |  | 300 | 730 | 530 | 480 | 850 |
| Adhesion of coating | Cross-cut adhesion test | 100 | 100 | 100 | 100 | 100 | 100 |
| Urethane resin coating | Peel strength test (*1) | 850 | 200 | 500 | 430 | 380 | 850 |

(*1) Unit of peel strength: g/cm

TABLE 1-2

| Composition | [Part by weight] | Example 13 | 14 | 15 | 16 | 17 | 18 | 19 | 20 | 21 |
|---|---|---|---|---|---|---|---|---|---|---|
| Component (a) | PP-1 | 70 | 60 | 70 | 60 | 50 | 60 | 80 | 50 | 30 |
| Component (b) | EPR | 30 | 40 | 30 | 40 | 50 | 40 | 20 | 50 | 70 |
| Component (c) | MPP-1 | — | — | 5 | 5 | 3 | 3 | 5 | — | — |
|  | MPP-2 | — | — | — | — | — | — | — | 3 | — |
|  | MPP-3 | — | — | — | — | — | — | — | — | 2 |

TABLE 1-2-continued

| Composition | [Part by weight] | Example 13 | 14 | 15 | 16 | 17 | 18 | 19 | 20 | 21 |
|---|---|---|---|---|---|---|---|---|---|---|
| | MPP-4 | — | 3 | — | — | — | — | — | — | — |
| | MPP-9 | 7 | — | — | — | — | — | — | — | — |
| Organotin compound | DBTDL | 0.5 | — | — | — | — | — | — | — | — |
| Tertiary amino compound | DABCO | — | 1 | — | — | — | — | — | — | — |
| Physical properties FM | [kg/cm$^2$] | 12000 | 9900 | 11800 | 9700 | 5500 | 9500 | 15300 | 6200 | 2100 |
| Adhesion of coating | Cross-cut adhesion test | | 100 | | 100 | | 100 | 100 | 100 | 100 |
| Melamine resin coating | Peel strength test (*1) | | 350 | | 730 | | 700 | 400 | 830 | 950 |
| Adhesion of coating | Cross-cut adhesion test | 100 | 100 | 100 | 100 | 100 | 100 | 100 | 100 | 100 |
| Urethane resin coating | Peel strength test (*1) | 850 | 420 | 700 | 490 | 1500 | 470 | 350 | 950 | 1300 |

(*1) Unit of peel strength: g/cm

TABLE 1-3

| Composition | [Part by weight] | Example 22 | 23 | 24 | 25 | 26 | 27 | 28 |
|---|---|---|---|---|---|---|---|---|
| Component (a) | PR-1 | — | — | — | — | — | 60 | 60 |
| | PP-2 | 70 | 60 | 70 | — | — | — | — |
| | PP-4 | — | — | — | 65 | 70 | — | — |
| Component (b) | EPR | 30 | 40 | 30 | — | — | 40 | 40 |
| | EBR | — | — | — | 35 | 30 | — | — |
| Component (c) | MPP-1 | 5 | 7 | 5 | — | — | 7 | 5 |
| | MPP-5 | — | — | — | 3 | 3 | — | — |
| Filler | Talc | — | — | — | — | 15 | 15 | — |
| | magnesium sulfate | — | — | — | — | — | — | 15 |
| Organotin compound | DBTDL | — | — | — | — | — | — | — |
| Physical properties FM | [kg/cm$^2$] | 9000 | 8500 | 7000 | 10500 | 16500 | 13000 | 22000 |
| Adhesion of coating | Cross-cut adhesion test | | | | 100 | 100 | | |
| Melamine resin coating | Peel strength test (*2) | | | | 850 | 730 | | |
| Adhesion of coating | Cross-cut adhesion test | 100 | 100 | 100 | 100 | 100 | 100 | 100 |
| Urethane resin coating | Peel strength test (*2) | 1100 | 820 | 1220 | 480 | 420 | 800 | 650 |

| Composition | [Part by weight] | Comparative Example 1 | 2 | 3 | 4 | 5 | 6 |
|---|---|---|---|---|---|---|---|
| Component (a) | PR-1 | 100 | — | 100 | 100 | 100 | 60 |
| | PP-2 | — | — | — | — | — | — |
| | PP-4 | — | — | — | — | — | — |
| Component (b) | EPR | — | 100 | — | — | — | 40 |
| | EBR | — | — | — | — | — | — |
| Component (c) | MPP-1 | — | — | 7 | 10 | 10 | — |
| | MPP-5 | — | — | — | — | — | — |
| Filler | Talc | — | — | — | — | — | — |
| | magnesium sulfate | — | — | — | — | — | — |
| Organotin compound | DBTDL | — | — | — | — | 0.5 | 0.5 |
| Physical properties FM | [kg/cm$^2$] | 18000 | — | 16500 | 19500 | 17300 | 10300 |
| Adhesion of coating | Cross-cut adhesion test | 0 | (*1) | | 70 | 50 | 0 |
| Melamine resin coating | Peel strength test (*2) | — | (*1) | | 120 | 80 | — |
| Adhesion of coating | Cross-cut adhesion test | 0 | (*1) | 0 | 100 | 100 | 0 |
| Urethane resin coating | Peel strength test (*2) | — | (*1) | 50 | 60 | 60 | — |

(*1) Unmeasurable because of heat distortion of the specimen
(*2) Unit of peel strength: g/cm

EXAMPLES 29 & 30, COMPARATIVE EXAMPLES 7 & 8

The components shown in Table 2 were mixed with each other, and the resultant mixture was kneaded and granulated by a twin-screw kneading extruder (BT-30 type, produced by Plastic Kogakusha K.K.) at 200° C. to obtain pellets.

Then, the pellets were injection molded into a square plate (12 mm×13 mm×2 mm (thickness)) for a coating test by a screw in-line type injection molding machine (Toshiba Co., Ltd.) at 200° C., and the following coating test was carried out.

Coating Test Method

A two-pack type urethane resin coating (trade name: R-271, available from Nippon B Chemical K.K.) was prepared. In the preparation of a specimen for a cross-cut adhesion test, the square plate was spray-coated with the urethane resin coating by means of an air gun so that the thickness of the coating film was about 40 μm. Further, in the preparation of a specimen for a peel strength test, the square plate was spray-coated with the same coating by means of an air gun so that the thickness of the coating film was about 100 μm. Thereafter, each of the specimens was baked at 85° C. for 30 minutes to cure the coating. After completion of the baking, the specimens were allowed to stand for 72 hours at room temperature, and then subjected to the following cross-cut adhesion test and peel strength test.

The results are set forth in Table 2

Cross-Cut Adhesion Test

On the surface of the specimen, cuts of 11 lines parallel to each other were made at intervals of 2 mm in the longitudinal direction and in the crosswise direction (those directions being at right angles), respectively, by the use of a single-edged razor to form 100 checkers, on which a cellophane adhesive tape (JIS-Z-1522) was firmly bonded. Then, the adhesive tape was peeled off at one stroke from the coating film surface while keeping the angle between the adhesive tape and the coating film surface at about 30°. The state of the checkers was observed and the number of the checkers having the coating film thereon was counted.

Peel Strength Test

On the surface of the coating film (thickness: 100 μm) of the specimen, linear cuts were made at intervals of 1 cm by the use of a single-edged razor. The belt-like portion of the coating film was pulled in the direction of 180° at a rate of 50 mm/min by means of a tensile tester, and a load required for peeling off the belt-like portion from the specimen was measured.

The results are set forth in Table 2.

TABLE 2

| Composition | [Part by weight] | Example 29 | Example 30 | Comp. Example 7 | Comp. Example 8 |
|---|---|---|---|---|---|
| Component (a) | PP-3 | 50 | 45 | 50 | 60 |
| Component (b) | EPR | 40 | 36 | 40 | 40 |
| Component (c) | MPP-1 | 10 | 9 | — | — |
| Component (c-1) | GPP-1 | — | — | 10 | — |
| Filler | Talc | — | 10 | — | — |
| Organotin compound | DBTDL | 0.2 | 0.2 | 0.2 | 0.2 |
| Adhesion of coating | Cross-cut adhesion test | 100 | 100 | 10 | 0 |
| Urethane resin coating | Peel strength test (*1) | 1200 | 1100 | 100 | 10 |

(*1) Unit of peel strength: g/cm

EXAMPLES 31–47, COMPARATIVE EXAMPLES 9–11

The components shown in Table 3 were melt-kneaded by a twin-screw vented extruder (screw diameter: 30 mm, L/D=42) at a cylinder preset temperature of 200° C. to prepare propylene polymer composition. This composition was molded into a square plate by an injection molding machine to obtain a specimen for the aforesaid flexural test or coating test, and those tests were carried out.

The results are set forth in Table 3.

TABLE 3-1

| Composition | [Part by weight] | Example 31 | Example 32 | Example 33 | Example 34 | Example 35 | Example 36 |
|---|---|---|---|---|---|---|---|
| Component (a) | PP-1 | 60 | 60 | 60 | 60 | 60 | 60 |
| Component (b) | EPR | 40 | 40 | 40 | 40 | 40 | 40 |
| Component (c-1) | GPP-1 | 3 | — | — | — | — | — |
|  | GPP-2 | — | 3 | — | — | — | 5 |
|  | GPP-3 | — | — | 3 | — | — | — |
|  | GPP-4 | — | — | — | 3 | — | — |
|  | GPP-5 | — | — | — | — | 3 | — |
| Component (c-2) | A-1 | 1 | 0.5 | 0.5 | 1 | 1 | 1 |
|  | A-2 | — | — | — | — | — | — |
|  | A-3 | — | — | — | — | — | — |
| Filler | Talc | 10 | 10 | 10 | 10 | 10 | 15 |
| Organotin compound | DBTDL | — | — | — | — | — | — |
| Tertiary amino compound | DABCO | — | — | — | — | — | — |
| Physical properties FM | [kg/cm$^2$] | 14500 | 13800 | 14400 | 14100 | 13500 | 14800 |
| Adhesion of coating | Cross-cut adhesion test | 100 | 100 | 100 | 100 | 100 | 100 |
| Melamine resin coating | Peel strength test (*1) | 850 | 780 | 700 | 400 | 360 | 780 |
| Adhesion of coating | Cross-cut adhesion test | 100 | 100 | 100 | 100 | 100 | 100 |
| Urethane resin coating | Peel strength test (*1) | 500 | 530 | 600 | 200 | 180 | 600 |

| Composition | [Part by weight] | Example 37 | Example 38 | Example 39 | Example 40 | Example 41 | Example 42 |
|---|---|---|---|---|---|---|---|
| Component (a) | PP-1 | 60 | 60 | 60 | 60 | 60 | 60 |
| Component (b) | EPR | 40 | 40 | 40 | 40 | 40 | 40 |
| Component (c-1) | GPP-1 | — | — | — | — | — | — |
|  | GPP-2 | 10 | 3 | — | — | — | — |

TABLE 3-1-continued

| | | | | | | | |
|---|---|---|---|---|---|---|---|
| | GPP-3 | — | — | — | 3 | — | 3 |
| | GPP-4 | — | — | 3 | — | — | — |
| | GPP-5 | — | — | — | — | 10 | — |
| Component (c-2) | A-1 | 1 | 0.5 | — | — | — | — |
| | A-2 | — | — | 1 | — | — | 1 |
| | A-3 | — | — | — | 0.2 | 2 | — |
| Filler | Talc | 15 | 20 | — | — | — | — |
| Organotin compound | DBTDL | — | 0.5 | — | — | — | — |
| Tertiary amino compound | DABCO | — | — | — | — | — | 0.5 |
| Physical properties FM | [kg/cm$^2$] | 15000 | 15600 | 9600 | 9800 | 10000 | 9900 |
| Adhesion of coating | Cross-cut adhesion test | 100 | 100 | 100 | 100 | 100 | 100 |
| Melamine resin coating | Peel strength test (*1) | 850 | 820 | 420 | 720 | 580 | 750 |
| Adhesion of coating | Cross-cut adhesion test | 100 | 100 | 100 | 100 | 100 | 100 |
| Urethane resin coating | Peel strength test (*1) | 620 | 800 | 180 | 420 | 250 | 700 |

(*1) Unit of peel strength: g/cm

TABLE 3-2

| | | Example | | | | |
|---|---|---|---|---|---|---|
| Composition | [Part by weight] | 43 | 44 | 45 | 46 | 47 |
| Component (a) | PP-1 | 85 | 40 | — | — | — |
| | PP-4 | — | — | 70 | 60 | 65 |
| Component (b) | EPR | 15 | 60 | — | 40 | — |
| | EBR | — | — | 30 | — | 35 |
| Component (c-1) | GPP-1 | 5 | — | — | — | — |
| | GPP-2 | — | 2 | — | — | — |
| | GPP-3 | — | — | 7 | — | — |
| | GPP-4 | — | — | — | 6 | — |
| | GPP-5 | — | — | — | — | 5 |
| Component (c-2) | A-1 | 1 | — | — | — | — |
| | A-2 | — | 0.5 | — | 1 | 0.2 |
| | A-3 | — | — | 1 | — | — |
| Filler | Talc | — | — | — | 10 | 15 |
| Organotin compound | DBTDL | — | — | — | — | — |
| Physical properties FM | [kg/cm$^2$] | 16500 | 2200 | 12200 | 13800 | 14800 |
| Adhesion of coating | Cross-cut adhesion test | 100 | 100 | 100 | 100 | 100 |
| Melamine resin coating | Peel strength test (*1) | 330 | 820 | 510 | 320 | 300 |
| Adhesion of coating | Cross-cut adhesion test | 100 | 100 | 100 | 100 | 100 |
| Urethane resin coating | Peel strength test (*1) | 280 | 1000 | 350 | 210 | 230 |

| | | Example | | |
|---|---|---|---|---|
| Composition | [Part by weight] | 9 | 10 | 11 |
| Component (a) | PP-1 | 60 | 60 | 60 |
| | PP-4 | — | — | — |
| Component (b) | EPR | 40 | 40 | 40 |
| | EBR | — | — | — |
| Component (c-1) | GPP-1 | 5 | — | — |
| | GPP-2 | — | — | 7 |
| | GPP-3 | — | — | — |
| | GPP-4 | — | — | — |
| | GPP-5 | — | — | — |
| Component (c-2) | A-1 | — | 1 | — |
| | A-2 | — | — | — |
| | A-3 | — | — | — |
| Filler | Talc | — | — | — |
| Organotin compound | DBTDL | — | 1 | 1 |
| Physical properties FM | [kg/cm$^2$] | 10300 | 10100 | 10500 |
| Adhesion of coating | Cross-cut adhesion test | 100 | 0 | 30 |
| Melamine resin coating | Peel strength test (*1) | 100 | 80 | 80 |
| Adhesion of coating | Cross-cut adhesion test | 100 | 0 | 70 |

TABLE 3-2-continued

| Urethane resin coating | Peel strength test (*1) | 120 | 30 | 100 |

(*1) Unit of peel strength: g/cm

What is claimed is:

1. A propylene polymer composition produced by melt kneading a mixture consisting of:
   (a) a propylene polymer in an amount of 1 to 99 parts by weight,
   (b) an olefin elastomer in an amount of 99 to 1 parts by weight, said olefin elastomer selected from the group consisting of copolymers consisting of α-olefins and copolymers consisting of α-olefins and a non-conjugated diene,
      the total amount of said component (a) and said component (b) being 100 parts by weight,
   (c) a polar group-containing olefin polymer in an amount of 1 to 30 parts by weight based on 100 parts by weight of the total amount of the component (a) and the component (b), said polar group-containing olefin polymer having been obtained by heating (c-1) an olefin polymer containing a carboxyl group or an acid anhydride group in its molecule and having an intrinsic viscosity (η), as measured in decalin at 135° C. in the range of 0.1 to 2.0 dl/g and (c-2) an amino compound,
   (d) optionally, an organotin compound and/or a tertiary amino compound in an amount of 0.01 to 5 parts by weight based on 100 parts by weight of the total amount of the component (a) and the component (b), and
   (e) optionally, one or more additives selected from the group consisting of thermoplastic resins, softening agents, fillers, pigments, stabilizers, plasticizers, flame retardants, lubricants and antistatic agents,
      wherein said thermoplastic resins are selected from the group consisting of high-density polyethylene, medium-density polyethylene, high-pressure low density polyethylene, linear low-density polyethylene, poly-1-butene, propylene/1-butene copolymer, styrene/butadiene block copolymer and its hydrogenation product, styrene/butadiene/styrene block copolymer and its hydrogenation product, styrene/isoprene block copolymer and its hydrogenation product and styrene/isoprene/styrene block copolymer and its hydrogenation product.

2. The propylene polymer composition as claimed in claim 1, wherein the olefin polymer (c-1) is a propylene homopolymer containing a carboxyl group or an acid anhydride group in its molecule or a propylene/ethylene random copolymer having an ethylene content of 1 to 5% by mol and containing a carboxyl group or an acid anhydride group in its molecule.

3. The propylene polymer composition as claimed in claim 2, wherein the olefin polymer (c-1) is a propylene/ethylene random copolymer having an ethylene content of 1 to 5% by mol and an intrinsic viscosity [η], as measured in decalin at 135° C., of in the range of 0.1 to 1.0 dl/g and containing a carboxyl group or an acid anhydride group in its molecule.

4. The propylene polymer composition as claimed in claim 1 wherein the amino compound (C-2) is 2-aminoethanol, N-aminoethylethanolamine or 2-(2-aminoethoxy)ethanol.

5. A propylene polymer composition produced by melt kneading a mixture consisting of:
   (a) a propylene polymer in an amount of 1 to 99 parts by weight,
   (b) an olefin elastomer in an amount of 99 to 1 part by weight, said olefin elastomer selected from the group consisting of copolymers consisting of α-olefins and copolymers consisting of α-olefins and a non-conjugated diene,
      the total amount of said component (a) and said component (b) being 100 parts by weight,
   (c-1) an olefin polymer containing a carboxyl group or an acid anhydride group in its molecule, having an intrinsic viscosity (η), as measured in decalin at 135° C., in the range of 0.1 to 2.0 dl/g, in an amount of 1 to 20 parts by weight,
   (c-2) an amino compound in an amount of 0.01 to 10 parts by weight,
   (d) optionally, an organotin compound and/or a tertiary amino compound in an amount of 0.01 to 5 parts by weight based on 100 parts by weight of the total amount of the component (a) and the (b), and
   (e) optionally, one or more additives selected from the group consisting of thermoplastic resins, softening agents, fillers, pigments, stabilizers, plasticizers, flame retardants, lubricants and antistatic agents,
      wherein said thermoplastic resins are selected from the group consisting of high-density polyethylene, medium-density polyethylene, high-pressure low density polyethylene, linear low-density polyethylene, poly-1-butene, propylene/1-butene copolymer, styrene/butadiene block copolymer and its hydrogenation product, styrene/butadiene/styrene block copolymer and its hydrogenation product, styrene/isoprene block copolymer and its hydrogenation product and styrene/isoprene/styrene block copolymer and its hydrogenation product.

6. The propylene polymer composition as claimed in claim 5, wherein the olefin polymer (c-1) is a propylene homopolymer containing a carboxyl group or an acid anhydride group in its molecule or a propylene/ethylene random copolymer having an ethylene content of 1 to 5% by mol and containing a carboxyl group or an acid anhydride group in its molecule.

7. The propylene polymer composition as claimed in claim 6, wherein the olefin polymer (c-1) is a propylene/ethylene random copolymer having an ethylene content of 1 to 5% by mol and an intrinsic viscosity [η], as measured in decalin at 135° C., of not more than 1 dl/g and containing a carboxyl group or an acid anhydride group in its molecule.

8. The propylene polymer composition as claimed in claim 5 wherein the amino compound (C-2) is 2-aminoethanol, N-aminoethylethanolamine or 2-(2-aminoethoxy)ethanol.

9. The propylene polymer composition as claimed in claim 1, wherein said propylene polymer (a) is selected from the group consisting of a propylene homopolymer, a crystalline propylene/ethylene block copolymer having an ethylene content of 2 to 40% by mol and a crystalline propylene/ethylene random copolymer having an ethylene content of 0.5 to 10% by mol.

10. The propylene polymer composition as claimed in claim 1, wherein said olefin elastomer (b) is amorphous.

11. The propylene polymer composition as claimed in claim 1, wherein said olefin polymer (c-1) is selected from the group consisting of a copolymer of an α-olefin with an unsaturated compound containing a carboxyl group or an acid anhydride group in its molecule, a copolymer having been obtained by grafting an unsaturated compound containing a carboxyl group or an acid anhydride group in its molecule to a homopolymer or copolymer of an α-olefin and a copolymer having been obtained by grafting an unsaturated compound containing a carboxyl group or an acid anhydride group in its molecule to a copolymer of an α-olefin with an unsaturated compound containing a carboxyl group or an acid anhydride group in its molecule.

12. The propylene polymer composition as claimed in claim 5, wherein said propylene polymer (a) is selected from the group consisting of a propylene homopolymer, a crystalline propylene/ethylene block copolymer having an ethylene content of 2 to 40% by mol and a crystalline propylene/ethylene random copolymer having an ethylene content of 0.5 to 10% by mol.

13. The propylene polymer composition as claimed in claim 5, wherein said olefin elastomer (b) is amorphous.

14. The propylene polymer composition as claimed in claim 5, wherein said olefin polymer (c-1) is selected from the group consisting of a copolymer of an α-olefin with an unsaturated compound containing a carboxyl group or an acid anhydride group in its molecule, a copolymer having been obtained by grafting an unsaturated compound containing a carboxyl group or an acid anhydride group in its molecule to a homopolymer or copolymer of an α-olefin and a copolymer having been obtained by grafting an unsaturated compound containing a carboxyl group or an acid anhydride group in its molecule to a copolymer of an α-olefin with an unsaturated compound containing a carboxyl group or an acid anhydride group in its molecule.

15. The propylene polymer composition as claimed in claim 11, wherein said olefin polymer (c-1) is selected from the group consisting of a copolymer having been obtained by grafting an unsaturated compound containing a carboxyl group or an acid anhydride group in its molecule to a homopolymer or copolymer of an α-olefin and a copolymer having been obtained by grafting an unsaturated compound containing a carboxyl group or an acid anhydride group in its molecule to a copolymer of an α-olefin with an unsaturated compound containing a carboxyl group or an acid anhydride group in its molecule; wherein, during said grafting, the unsaturated compound containing a carboxyl group or an acid anhydride group in its molecule was used in an amount of 0.01 to 50 parts by weight, based on 100 parts by weight of the homopolymer or copolymer of an α-olefin; and wherein the olefin polymer (c-1) was obtained by said grafting in the presence of a radical initiator in an amount of 0.01 to 10 parts by weight, based on 100 parts by weight of the homopolymer or copolymer of an α-olefin.

16. The propylene polymer composition as claimed in claim 14, wherein said olefin polymer (c-1) is selected from the group consisting of a copolymer having been obtained by grafting an unsaturated compound containing a carboxyl group or an acid anhydride group in its molecule to a homopolymer or copolymer of an α-olefin and a copolymer having been obtained by grafting an unsaturated compound containing a carboxyl group or an acid anhydride group in its molecule to a copolymer of an α-olefin with an unsaturated compound containing a carboxyl group or an acid anhydride group in its molecule; wherein, during said grafting, the unsaturated compound containing a carboxyl group or an acid anhydride group in its molecule was used in an amount of 0.01 to 50 parts by weight, based on 100 parts by weight of the homopolymer or copolymer of an α-olefin; and wherein the olefin polymer (c-1) was obtained by said grafting in the presence of a radical initiator in an amount of 0.01 to 10 parts by weight, based on 100 parts by weight of the homopolymer or copolymer of an α-olefin.

* * * * *